United States Patent
Manders et al.

(10) Patent No.: US 7,999,045 B2
(45) Date of Patent: Aug. 16, 2011

(54) METHOD FOR PRODUCING AQUEOUS POLYMER DISPERSION

(75) Inventors: Lambertus Manders, Ludwigshafen (DE); Ilshat Gubaydullin, Ludwigshafen (DE); Wolfgang Gaschler, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 422 days.

(21) Appl. No.: 12/303,859

(22) PCT Filed: Jun. 19, 2007

(86) PCT No.: PCT/EP2007/056042
§ 371 (c)(1),
(2), (4) Date: Dec. 8, 2008

(87) PCT Pub. No.: WO2008/000649
PCT Pub. Date: Jan. 3, 2008

(65) Prior Publication Data
US 2010/0298492 A1    Nov. 25, 2010

(30) Foreign Application Priority Data

Jun. 26, 2006   (EP) ................................. 06116062

(51) Int. Cl.
*C08F 6/14*   (2006.01)
*C08J 3/03*   (2006.01)

(52) U.S. Cl. ............................ 526/72; 526/71; 526/89
(58) Field of Classification Search .................. 526/72, 526/71, 89
See application file for complete search history.

(56) References Cited

U.S. PATENT DOCUMENTS

| | | | |
|---|---|---|---|
| 3,374,143 A | 3/1968 | Stephenson | |
| 5,242,596 A | 9/1993 | Bachem et al. | |
| 5,401,582 A | 3/1995 | Weyland et al. | |
| 6,248,809 B1 | 6/2001 | Buckley et al. | |
| 2007/0238820 A1* | 10/2007 | Burghart et al. | 524/376 |

FOREIGN PATENT DOCUMENTS

| | | | |
|---|---|---|---|
| DE | 40 03 422 | | 8/1991 |
| DE | 40 07 637 | | 9/1991 |
| DE | 4007637 A | * | 9/1991 |
| EP | 0 512 736 | | 11/1992 |
| EP | 0 527 386 | | 2/1993 |
| WO | 95 05344 | | 2/1995 |

OTHER PUBLICATIONS

Encyclopedia of Polymer Science and Engineering, John Wiley and Sons, vol. 8, pp. 659-677 (1987).
Dieterich, D., "Polyurethane—Nach 50 Jahren Immer Noch Jung", Chemie in Unserer Zeit, vol. 24, No. 3, pp. 135-142 (1990).
Zahka, J. et al., "Ultrafiltration of Latex Emulsions", Chem. Eng. Progr., vol. 73, pp. 53-55 (1977).

* cited by examiner

*Primary Examiner* — Kelechi C Egwim
(74) *Attorney, Agent, or Firm* — Oblon, Spivak, McClelland, Maier & Neustadt, L.L.P.

(57) ABSTRACT

A process for preparing an aqueous polymer dispersion using flush water.

6 Claims, No Drawings

METHOD FOR PRODUCING AQUEOUS POLYMER DISPERSION

The present invention provides a process for preparing an aqueous polymer dispersion having a polymer solids content of X % by weight by free-radically initiated aqueous emulsion polymerization in a polymerization vessel, which comprises preparing an aqueous polymer dispersion with a polymer solids content of X+Y % by weight by the free-radically initiated aqueous emulsion polymerization in the polymerization vessel, transferring this aqueous polymer dispersion to a receiver, flushing the polymerization vessel with water and using the resulting flush water to dilute the aqueous polymer dispersion in the receiver to a solids content of X % by weight.

Aqueous polymer dispersions are common knowledge. They are fluid systems which comprise, as a disperse phase in an aqueous dispersion medium, polymer knots consisting of several entangled polymer chains, known as the polymer matrix or polymer beads, in disperse distribution. The mean diameter of the polymer beads is frequently in the range from 10 to 1000 nm, in particular in the range from 50 to 600 nm. Aqueous polymer dispersions are used as binders in a multitude of industrial applications, for example in paints or plasters, in leather, paper or polymer film coatings, and as components in adhesives.

Aqueous polymer dispersions are obtainable in particular by free-radically initiated aqueous emulsion polymerization of ethylenically unsaturated monomers. This method has been described many times and is therefore sufficiently well known to the person skilled in the art [cf., for example, Encyclopedia of Polymer Science and Engineering, Vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, $2^{nd}$ Edition, Vol. 1, pages 33 to 415, Chapman & Hall, 1997; H. Warson, The Applications of Synthetic Resin Emulsions, pages 49 to 244, Ernest Benn, Ltd., London, 1972; D. Diederich, Chemie in unserer Zeit 1990, 24, pages 135 to 142, Verlag Chemie, Weinheim; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969 and the patent DE-A 40 03 422]. The free-radically initiated aqueous emulsion polymerization is effected typically in such a way that at least one ethylenically unsaturated monomer, frequently with the additional use of dispersing assistants, is distributed in a disperse manner in aqueous medium and polymerized by means of at least one free-radical polymerization initiator. The aqueous polymer dispersions are generally prepared with the polymer solids content with which the ready-to-use aqueous polymer dispersions are supplied to the customer or processed further in house.

The free-radically initiated aqueous emulsion polymerization is performed, especially on the industrial scale, generally semicontinuously in polymerization vessels, known as polymerization reactors, which have complicated equipment both in apparatus and in measurement and control technology terms, and are thus expensive, which is why short cycle times and high space-time yields are desired for these reactors. This is achieved in particular by production in campaigns, i.e. aqueous polymer dispersions of the same composition are prepared successively by an identical preparation method and, for further processing, especially for post-polymerization and for the removal of volatile organic constituents, transferred to a reaction vessel with technically simpler equipment, for example a so-called blow-down reactor, finishing vessel or stripping vessel. In order to achieve minimum cycle times in the polymerization reactor, the polymerization reactor is generally not cleaned between the individual batches of a campaign, i.e. after the polymerization reactor has been completely emptied of the preceding batch and the initial charge of portions or total amounts of individual feedstocks of the next batch. If at all, the polymerization reactor is cleaned between the individual campaigns, i.e. when the product is changed to a different aqueous polymer dispersion which, for example, has a different polymer composition and is therefore prepared by a different preparation method. In this case, the cleaning is generally effected by flushing the polymerization reactor with water, frequently by means of water spray heads installed permanently or inserted temporarily. The cleaning water obtained in this case comprises small amounts of fine polymers and is familiar to those skilled in the art as so-called "white water". The white water obtained in the cleaning and flushing of plant parts, especially polymerization reactors, i.e. very dilute aqueous polymer dispersions, are generally precipitated and incinerated, added to the wastewater in need of treatment for biodegradation, or, in individual cases, concentrated by means of ultrafiltration in a costly manner [on this subject, see, for example, EP-A 512736, EP-A 527386, WO 95/05344, U.S. Pat. No. 6,248,809 and J. Zahka and L. Mir, Chem. Eng. Progr. 73 (1977), pages 53 to 55]. Product losses or increased workup costs are the consequence. Moreover, the aqueous polymer dispersions prepared in campaigns frequently have undesired coagulated polymer. This coagulated polymer with a particle size of a few micrometers to a few centimeters can lower the clarity of the polymer films obtained from the aqueous polymer dispersions ("spots"), reduce the binding power of the polymers in paint, plaster, coating or adhesive formulations, or lead to troublesome deposits in production plants and processing machines.

It was therefore an object of the present invention to provide a process for preparing an aqueous polymer dispersion which ensures short cycle times, reduces product losses and/or workup costs, and/or provides an aqueous polymer dispersion with reduced coagulate content.

Accordingly, we have found the process described above.

For the preparation of the aqueous polymer dispersions, useful ethylenically unsaturated monomers are in particular easily free-radically polymerizable ethylenically unsaturated compounds, for example ethylene, vinylaromatic monomers such as styrene, α-methylstyrene, o-chlorostyrene or vinyltoluenes, vinyl halides such as vinyl chloride or vinylidene chloride, esters of vinyl alcohol and monocarboxylic acids having from 1 to 18 carbon atoms, such as vinyl acetate, vinyl propionate, vinyl n-butyrate, vinyl laurate and vinyl stearate, esters of α,β-monoethylenically unsaturated mono- and dicarboxylic acids having preferably from 3 to 6 carbon atoms, especially acrylic acid, methacrylic acid, maleic acid, fumaric acid and itaconic acid, with alkanols having generally from 1 to 12, preferably from 1 to 8 and in particular from 1 to 4 carbon atoms, particularly the methyl, ethyl, n-butyl, isobutyl, pentyl, hexyl, heptyl, octyl, nonyl, decyl and 2-ethylhexyl esters of acrylic acid and methacrylic acid, the dimethyl or di-n-butyl esters of fumaric acid and maleic acid, nitriles of α,β-monoethylenically unsaturated carboxylic acids, such as acrylonitrile, methacrylonitrile, fumaronitrile, maleonitrile, and $C_{4-8}$ conjugated dienes such as 1,3-butadiene and isoprene. The monomers mentioned are generally the main monomers which, based on the total amount of monomers, account for a proportion of more than 50%, preferably more than 80% by weight. In general, these monomers have merely moderate to low solubility in water under standard conditions [20° C., 1 atm (=1.013 bar absolute)].

Monomers which have increased water solubility under the aforementioned conditions are those which comprise either at least one acid group and/or the corresponding anion thereof, or at least one amino, amido, ureido or N-heterocyclic group and/or the ammonium derivatives thereof protonated or alkylated on the nitrogen. Examples include α,β-monoethylenically unsaturated mono- and dicarboxylic acids and amides thereof, for example acrylic acid, methacrylic acid, maleic acid, fumaric acid, itaconic acid, acrylamide and methacrylamide, and also vinylsulfonic acid, 2-acrylamido-2-methylpropanesulfonic acid, styrenesulfonic acid and the water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino) ethyl methacrylate, N-(3-N',N'-dimethylaminopropyl)methacrylamide and 2-(1-imidazolin-2-onyl)ethyl methacrylate. Normally, the aforementioned monomers are present merely as modifying monomers in amounts of less than 10% by weight, preferably less than 5% by weight, based on the total amount of monomers.

Monomers which typically increase the inner strength of the films of the polymer matrix normally have at least one epoxy, hydroxyl, N-methylol or carbonyl group, or at least two nonconjugated ethylenically unsaturated double bonds. The examples thereof are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids, among which preference is given to acrylic acid and methacrylic acid. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Of particular significance in this context are also the $C_1$-$C_8$-hydroxyalkyl esters of methacrylic acid and acrylic acid, such as n-hydroxyethyl, n-hydroxypropyl or n-hydroxybutyl acrylate and methacrylate, and also compounds such as diacetoneacrylamide and acetylacetoxyethyl acrylate or methacrylate. Frequently, the aforementioned monomers are used in amounts of up to 10% by weight, but preferably in amounts of less than 5% by weight, based in each case on the total amount of monomers.

Aqueous polymer dispersions preparable particularly efficiently in accordance with the invention are those whose polymers comprise, in copolymerized form,

| from 50 to 99.9% by weight of | esters of acrylic acid and/or methacrylic acid with alkanols having from 1 to 12 carbon atoms or styrene, or |
| --- | --- |
| from 50 to 99.9% by weight of | styrene and butadiene, or |
| from 50 to 99.9% by weight of | vinyl chloride and/or vinylidene chloride, or |
| from 40 to 99.9% by weight of | vinyl acetate, vinyl propionate and/or ethylene. |

Especially advantageous aqueous polymer dispersions preparable in accordance with the invention are those whose polymers comprise, in copolymerized form,

| from 0.1 to 5% by weight of | at least one α,β-monoethylenically unsaturated mono- and/or dicarboxylic acid having from 3 to 6 carbon atoms and/or the amide thereof and |
| --- | --- |
| from 50 to 99.9% by weight of | at least one ester of acrylic acid and/or methacrylic acid with alkanols having from 1 to 12 carbon atoms or styrene, or |
| from 0.1 to 5% by weight of | at least one α,β-monoethylenically unsaturated mono- and/or dicarboxylic acid having from 3 to 6 carbon atoms and/or the amide thereof and |
| from 50 to 99.9% by weight of | styrene and butadiene, or |
| from 0.1 to 5% by weight of | at least one α,β-monoethylenically unsaturated mono- and/or dicarboxylic acid having from 3 to 6 carbon atoms and/or the amide thereof and |
| from 50 to 99.9% by weight of | vinyl chloride and/or vinylidene chloride, or |
| from 0.1 to 5% by weight of | at least one α,β-monoethylenically unsaturated mono- and/or dicarboxylic acid having from 3 to 6 carbon atoms and/or the amide thereof and |
| from 40 to 99.9% by weight of | vinyl acetate, vinyl propionate and/or ethylene. |

The process according to the invention is generally performed in the presence of from 0.1 to 5% by weight, preferably from 0.1 to 4% by weight and in particular from 0.1 to 3% by weight, based in each case on the total amount of monomers, of a free-radical polymerization initiator (free-radical initiator). Useful free-radical initiators are all of those which are capable of initiating a free-radical aqueous emulsion polymerization. They may in principle be either peroxides or azo compounds. Of course, redox initiator systems are also useful. The peroxides used may in principle be inorganic peroxides such as hydrogen peroxide or peroxodisulfates, such as the mono- or di-alkali metal or ammonium salts of peroxodisulfuric acid, for example the mono- and disodium, mono- and dipotassium or ammonium salts, or organic peroxides such as alkyl hydroperoxides, for example tert-butyl, p-menthyl or cumyl hydroperoxide, and also dialkyl or diaryl peroxides, such as di-tert-butyl or dicumyl peroxide. The azo compounds used are essentially 2,2"-azobis(isobutyronitrile), 2,2"-azobis(2,4-dimethyl-valeronitrile) and 2,2"-azobis(amidinopropyl) dihydrochloride (AIBA, corresponds to V-50 from Wako Chemicals). It is of course also possible to use so-called redox initiator systems as free-radical initiators. Useful oxidizing agents for redox initiator systems are essentially the abovementioned peroxides. The corresponding reducing agents used may be sulfur compounds with low oxidation state, such as alkali metal sulfites, for example potassium sulfite and/or sodium sulfite, alkali metal hydrogensulfites, for example potassium hydrogensulfite and/or sodium hydrogensulfite, alkali metal metabisulfites, for example potassium metabisulfite and/or sodium metabisulfite, formaldehydesulfoxylates, for example potassium formaldehydesulfoxylate and/or sodium formaldehydesulfoxylate, alkali metal salts, especially potassium and/or sodium salts of aliphatic sulfinic acids and alkali metal hydrogensulfides, for example potassium hydrogensulfide and/or sodium hydrogensulfide, salts of polyvalent metals, such as iron(II) sulfate, iron(II) ammonium sulfate, iron(II) phosphate, enediols such as dihydroxymaleic acid, benzoin and/or ascorbic acid, and reducing saccharides such as sorbose, glucose, fructose and/or dihydroxyacetone.

In the process according to the invention, dispersing assistants are typically used, which keep both the monomer droplets and polymer particles dispersed in the aqueous phase and thus ensure the stability of the aqueous polymer dispersions obtained. Useful such dispersing assistants include both the protective colloids and emulsifiers used typically to perform free-radical aqueous emulsion polymerizations.

Suitable protective colloids are, for example, polyvinyl alcohols, cellulose derivatives or copolymers comprising vinylpyrrolidone. A comprehensive description of further suitable protective colloids can be found in Houben-Weyl, Methoden der organischen Chemie [Methods of Organic Chemistry], volume XIV/1, Makromolekulare Stoffe [Macromolecular substances], pages 411 to 420, Georg-Thieme-Verlag, Stuttgart, 1961. It is of course also possible to use mixtures of emulsifiers and/or protective colloids. The dispersing assistants used are preferably exclusively emulsifiers whose relative molecular weights, in contrast to the protective colloids, are typically below 1000. They may be of anionic, cationic or nonionic nature. Of course, in the case of use of mixtures of interface-active substances, the individual components have to be compatible with one another, which can be checked with the aid of a few preliminary experiments in the case of doubt. In general, anionic emulsifiers are compatible with one another and with nonionic emulsifiers. The same also applies to cationic emulsifiers, while anionic and cationic emulsifiers are usually not compatible with one another. Useful emulsifiers are, for example, ethoxylated mono-, di- and trialkylphenols (EO: 3 to 50, alkyl radical: $C_4$ to $C_{12}$), ethoxylated fatty alcohols (EO: 3 to 50; alkyl radical: $C_8$ to $C_{36}$) and alkali metal and ammonium salts of alkyl sulfates (alkyl radical: $C_8$ to $C_{12}$), of sulfuric monoesters of ethoxylated alkanols (EO: 4 to 30, alkyl radical: $C_{12}$ to $C_{18}$) and ethoxylated alkylphenols (EO: 3 to 50, alkyl radical: $C_4$ to $C_{12}$), of alkyl sulfonic acids (alkyl radical: $C_{12}$ to $C_{18}$) and of alkylarylsulfonic acids (alkyl radical: $C_9$ to $C_{18}$). Further suitable emulsifiers can be found in Houben-Weyl, Methoden der organischen Chemie, volume XIV/1, Makromolekulare Stoffe, pages 192 to 208, Georg-Thieme-Verlag, Stuttgart, 1961.

Useful interface-active substances have also been found to be compounds of the general formula I

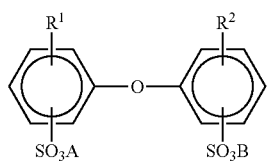

(I)

in which $R^1$ and $R^2$ are each $C_4$- to $C_{24}$-alkyl and one of the $R^1$ or $R^2$ radicals may also be hydrogen, and A and B may each be alkali metal ions and/or ammonium ions. In the general formula I, $R^1$ and $R^2$ are preferably each linear or branched alkyl radicals having from 6 to 18 carbon atoms, especially having 6, 12 and 16 carbon atoms, or hydrogen atoms, where $R^1$ and $R^2$ are not both simultaneously hydrogen atoms. A and B are preferably sodium, potassium or ammonium ions, particular preference being given to sodium ions. Particularly advantageous compounds I are those in which A and B are each sodium ions, $R^1$ is a branched alkyl radical having 12 carbon atoms and $R^2$ is a hydrogen atom or $R^1$. Frequently, industrial mixtures are used which have a content of from 50 to 90% by weight of the monoalkylated product, for example Dowfax® 2A1 (brand of Dow Chemical Company). The compounds I are commonly known, for example from U.S. Pat. No. 4,269,749, and commercially available.

Of course, the aforementioned dispersing assistants are suitable quite generally for the performance of the process according to the invention. However, the process according to the invention also comprises the preparation of aqueous polymer dispersions of self-emulsifying polymers in which monomers which have ionic groups bring about the stabilization owing to repulsion of charges of the same sign.

For the process according to the invention, preference is given to using nonionic and/or anionic dispersing assistants. However, it is also possible to use cationic dispersing assistants.

In general, the amount of dispersing assistant used is from 0.1 to 5% by weight, preferably from 1 to 3% by weight, based in each case on the total amount of ethylenically unsaturated monomers to be polymerized by a free-radical mechanism. It is frequently favorable when a portion or the total amount of the dispersing assistant is added to the fluid reaction medium before the initiation of the free-radical polymerization. In addition, a portion or the total amount of the dispersing assistant can be added to the aqueous reaction medium advantageously also together with the at least one monomer, especially in the form of an aqueous monomer emulsion during the polymerization.

Free-radical chain-transferring compounds are typically used to reduce or to control the molecular weight of the polymers obtainable by a free-radical aqueous emulsion polymerization. The compounds used are essentially aliphatic and/or araliphatic halogen compounds, for example n-butyl chloride, n-butyl bromide, n-butyl iodide, methylene chloride, ethylene dichloride, chloroform, bromoform, bromotrichloro-methane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols such as benzenethiol, ortho-, meta-, or para-methylbenzenethiol, and also all further sulfur compounds described in the Polymer Handbook, $3^{rd}$ edition, 1989, J. Brandrup and E. H. Immergut, John Wiley & Sons, section II, pages 133 to 141, but also aliphatic and/or aromatic aldehydes such as acetaldeyhde, propionaldehyde and/or benzaldehyde, unsaturated fatty acids such as oleic acid, dienes with nonconjugated double bonds, such as divinylmethane or vinylcyclohexane, or hydrocarbons with readily abstractable hydrogen atoms, for example toluene. However, it is also possible to use mixtures of aforementioned free-radical chain-transferring compounds which do not disrupt one another.

The total amount of the free-radical chain-transferring compounds used optionally in the process according to the invention, based on the total amount of the monomers to be polymerized, is generally ≦5% by weight, often ≦3% by weight and frequently ≦1% by weight.

In addition to the seed-free production method, the polymer particle size can be adjusted by effecting the emulsion polymerization by the seed latex process or in the presence of a seed latex prepared in situ. Processes for this purpose are known to those skilled in the art and can be taken from the prior art (see, for example, EP-B 40 419, EP-A 567 812, EP-A 614 922 and 'Encyclopedia of Polymer Science and Technology', Vol. 5, page 847, John Wiley & Sons Inc., New York, 1966). For instance, the prior art recommends, in the semicontinuous feed process, an initial charge of a defined fine seed polymer dispersion in the polymerization vessel and then the polymerization of at least one monomer in the presence of the seed latex. In this case, the seed polymer particles act as 'Polymerization nuclei' and decouple polymer particle formation and polymer particle growth. During the emulsion polymerization, further seed latex can be added directly into the polymerization reactor. This allows broad size distributions of the polymer particles to be achieved, which are often desired especially in the case of polymer dispersions with high solids content (on this subject, cf., for example, DE-A 4213965). Instead of the addition of a defined seed latex, it can also be generated in situ. For this purpose, for example, a portion of the at least one monomer and of the free-radical initiator is initially charged together with a portion or the total amount of the emulsifier and heated to reaction temperature, which forms a relatively fine polymer seed. Subsequently, in the same polymerization vessel, the actual polymerization is performed by the feed process (see also DE-A 4213965).

A useful reaction temperature for the process according to the invention is the entire range from 0 to 170° C.; however, preference is given to employing temperatures of from 70 to 120° C., preferably from 80 to 100° C. and more preferably from 85 to 100° C. The free-radical aqueous emulsion polymerization can be performed at a pressure less than, equal to or greater than 1 atm (absolute), so that the polymerization temperature can exceed 100° C. and be up to 170° C. Preference is given to polymerizing volatile monomers such as ethylene, butadiene or vinyl chloride under elevated pressure. The pressure may assume values of 1.2, 1.5, 2, 5, 10, 15 bar or even higher values. When emulsion polymerizations are performed under reduced pressure, pressures of 950 mbar, frequently of 900 mbar and often 850 mbar (absolute) are established. Advantageously, the free-radical aqueous emulsion polymerization is performed at 1 atm (=atmospheric pressure) under inert gas atmosphere, for example under nitrogen or argon.

It is essential to the invention that the aqueous polymer dispersion is prepared with a polymer solids content of X+Y % by weight which is higher by Y % by weight than the desired polymer solids content of X % by weight with which the aqueous polymer dispersion is supplied to customers or processed further in house.

X may be a value of ≧1 and ≦80. X is frequently a value of ≧5, ≧10, ≧15, ≧20, ≧25, ≧30, ≧35, ≧40, ≧45, ≧50, ≧55, ≧60, ≧65, ≧70 or ≦75, ≦70, ≦65, ≦60, ≦55 or ≦50 and all intermediate values. The value of X is advantageously ≧30 and ≦70 and especially advantageously ≧40 and ≦60. Particularly advantageously, X is equal to 50.

According to the invention, Y is a value of ≧0.01 and ≦50. Frequently, Y is a value of ≧0.03, ≧0.05, ≧0.10, ≧0.15, ≧0.20, ≧0.25, ≧0.30, ≧0.35, ≧0.40, ≧0.50, ≧1, ≧5, ≧10, ≧15, ≧20, ≧30, ≧40 or ≦45, ≦40, ≦35, ≦30, ≦25, ≦20, ≦15, ≦10, ≦5, ≦3, ≦1, ≦0.5 or ≦0.1 and all intermediate values. The value of Y is advantageously in the range of ≧0.1 and ≦15 and especially advantageously ≧0.25 and ≦10.

In the context of this document, the polymer solids content is determined by drying a small amount (approx. 3 to 5 g) of the aqueous polymer dispersion to constant weight in an aluminum crucible with an internal diameter of approx. 3 cm in a drying cabinet at 140° C.

Once the polymerization reaction in the polymerization vessel has been completed, the resulting (concentrated) polymer dispersion is emptied completely via a connecting line into a receiver with less complicated equipment, and the empty polymerization vessel which is wetted with aqueous polymer dispersion only on the walls, vessel internals and stirrer is flushed/cleaned by means of water, and the flush water obtained is likewise fed to the receiver via the connecting line, which dilutes the concentrated polymer dispersion present in the receiver.

Useful polymerization vessels are all vessels of different shape and size which can be used for the free-radically initiated aqueous emulsion polymerization. It is unimportant whether it is, for example, a 2 l glass flask on the laboratory scale or a 100 m³ stirred reactor on the industrial scale.

In this document, receivers are understood to mean reactors, stirred tanks, intermediate and storage vessels, but also containers, vats, canisters and cans, etc. of different size and shape.

Of course, the inventive flushing of the polymerization vessel also comprises the flushing of the connecting line between polymerization vessel and receiver, through which the aqueous polymer dispersion has been transferred from the polymerization vessel to the receiver.

It is unimportant from what material the polymerization vessels, the connecting lines or the receivers are built. The materials used are, for example, a wide variety of different alloyed and unalloyed quality steels, chemically resistant stainless steel types, such as 1.4541 and 1.4571 steel, but also aluminum which may if appropriate be provided with a wide variety of different internal coatings, such as enamel, silver, zinc and tin or polymers, for example PTFE, and varnishes, or polymers, for example polyethylene, polypropylene, polystyrene, polyacrylamide and glass fiber-reinforced synthetic resins. The polymerization vessels and receivers may comprise a wide variety of different internals, for example stirrers, heat exchangers, heating and/or cooling coils, baffles and sensors, but also a wide variety of different connections and orifices which are, if appropriate, closable by seals, such as ballcocks, valves of different design and screwed lids, etc.

In the present process according to the invention, the polymerization vessel is flushed or cleaned by using water, preferably drinking water and especially preferably steam condensate or deionized water. It is possible in accordance with the invention that the total amount of the flushing/cleaning water is such that the polymer solids content is reduced from X+Y % by weight to X % by weight. This is the case especially when the aqueous polymer dispersion, after dilution, is supplied to the customer without further aftertreatment. However, it is also possible that the total amount of the flushing/cleaning water is less than the amount required to dilute the aqueous polymer dispersion to X % by weight. This is the case especially when the aqueous polymer dispersion from one polymerization batch or a plurality of collected aqueous polymer dispersions are subjected to an aftertreatment step, for example for post-polymerization or for removal of volatile organic constituents, or for additization with further assistants, for example active biocidal ingredients or antifoams. In this case, the flushing/cleaning water is used to dilute the (collected) aqueous polymer dispersion(s), but the polymer solids content is set finally to X % by weight only after the aftertreatment step with clear, especially deionized and polymer-free water.

In the process according to the invention, it is possible to flush the polymerization vessel once with the total amount or repeatedly with portions of the flushing/cleaning water. The flushing of the polymerization vessel in itself is also uncritical and is effected, for example, with water spray heads installed permanently or inserted temporarily. It is of course also possible to initially charge the portion or the total amount of the flushing/cleaning water in the emptied polymerization vessel, and to bring about the cleaning/flushing by pumping the water in circulation or by switching on the stirrer. The temperature of the flushing/cleaning water is uncritical. It is preferably in the range from 5 to 60° C.

The process according to the invention is employed particularly advantageously when the ethylenically unsaturated monomers are converted in the polymerization vessel up to a conversion of $\geq$95% by weight, advantageously $\geq$98% by weight and especially advantageously $\geq$99% by weight (so-called main polymerization) and the resulting aqueous polymer dispersion is subjected in the receiver to an aftertreatment to reduce the residual monomer content. The aftertreatment is effected either chemically, for example by completing the polymerization reaction by use of a more effective free-radical initiator system (so-called post-polymerization), and/or physically, for example by stripping the aqueous polymer dispersion with steam or inert gas. Appropriate chemical and/or physical methods are familiar to those skilled in the art [see, for example, EP-A 771328, DE-A 19624299, DE-A 19621027, DE-A 19741184, DE-A 19741187, DE-A 19805122, DE-A 19828183, DE-A 19839199, DE-A 19840586 and 19847115]. The combination of chemical and physical aftertreatment offers the advantage that not only the unconverted ethylenically unsaturated monomers but also other troublesome volatile organic constituents (known as VOCs [volatile organic compounds]) are removed from the aqueous polymer dispersion.

The present process according to the invention allows polymer yield losses in the free-radically initiated aqueous emulsion polymerization to be minimized. In addition, the resulting aqueous polymer dispersions have relatively low coagulate contents, which is why the aqueous polymer dispersions can be used in particular as binders, in adhesives, sealants, polymer renders, papercoating slips and paints, for the finishing of leather and textiles, for fiber bonding and for the modification of mineral binders. In addition, it is possible by the process according to the invention—especially on the industrial production scale—to increase the polymer capacity in existing polymerization vessels.

The nonrestrictive example which follows is intended to illustrate the invention.

EXAMPLE

A clean and dry 5 l stainless steel pressure reactor equipped with an MIG stirrer and 4 metering units, a feed line with spray nozzle in the lid and an outlet line made of stainless steel in the bottom of the pressure reactor was initially charged at from 20 to 25° C. (room temperature) and under a nitrogen atmosphere with 800 g of deionized water, 100 g of an aqueous polystyrene seed (solids content 33% by weight, number-average particle diameter 32 nm), 10 g of acrylic acid, 50 g of a 7% by weight sodium persulfate solution, 45 g of styrene, 9 g of a 15% by weight aqueous sodium dodecyl-sulfate solution. Subsequently, the reactor contents were heated to 95° C. with stirring. On attainment of 95° C., the total amounts of feed 1 and feed 2 were metered in with constant flow rates continuously starting at the same time within 4 hours. Thereafter, the reactor contents were allowed to continue to react at 95° C. for another 1 hour. Feeds 3 and 4 were then started at the same time and the two feeds were metered in continuously with constant flow rates within 2 hours. The reaction mixture was then cooled to room temperature and the pressure vessel was decompressed to atmospheric pressure.

| Feed 1: homogeneous emulsion of | |
|---|---|
| 1000 g | of styrene |
| 900 g | of 1,3-butadiene |
| 100 g | of acrylic acid |
| 10 g | of trans-aconitic acid |
| 400 g | of deionized water |
| 10 g | of a 25% by weight aqueous sodium hydroxide solution |
| 20 g | of tert-dodecyl mercaptan and |
| 70 g | of a 15% by weight aqueous sodium dodecyl sulfate solution |

| Feed 2: | |
|---|---|
| 450 g | of a 4% by weight aqueous sodium persulfate solution |

| Feed 3: | |
|---|---|
| 45 g | of a 10% by weight aqueous solution of tert-butyl hydroperoxide |

| Feed 4: | |
|---|---|
| 60 g | of a 10% by weight aqueous solution of acetone bisulfite (molar 1:1 addition product of acetone and sodium hydrogensulfite) |

The resulting aqueous polymer dispersion was emptied via the outlet line at the bottom of the pressure reactor fully into a 25 l mixing vessel which was arranged below the pressure vessel within 15 minutes. Thereafter, 200 g of deionized water were sprayed into the pressure reactor via the spray nozzle at a pressure of 3 bar at room temperature via the feed line in the lid of the pressure reactor. The stainless steel spray nozzle had a disk-shaped design, a height of approx. 0.7 cm, a diameter of approx. 3 cm and 6 horizontal 0.7 mm spray orifices which were arranged in uniform distribution over the annular lateral outer face of the stainless steel disk (i.e. at 60° intervals). Once the deionized water had been sprayed in, it was left in the reactor for another 1 minute and then the pressure reactor was emptied again into the mixing vessel, while ensuring that the outlet line had also been emptied.

The pressure vessel which had been flushed in this way was charged again at room temperature and under a nitrogen atmosphere with 800 g of deionized water, 100 g of an aqueous polystyrene seed (solids content 33% by weight, number-average particle diameter 32 nm), 10 g of acrylic acid, 50 g of a 7% by weight sodium persulfate solution, 45 g of styrene, 9 g of a 15% by weight aqueous sodium dodecylsulfate solution, and, as described above, the next polymerization reaction was performed. In total, 5 polymerization reactions with subsequent flushing with deionized water were effected.

The aqueous copolymer dispersion thus obtained had a solids content of 49.5% by weight based on the total weight of the aqueous dispersion.

Addition of 430 g of deionized water adjusted the solids content of the aqueous polymer dispersion in the mixing vessel to 45.0% by weight. The particle size was determined to be 135 nm and the coagulate content to be 40 ppm.

The solids contents were determined generally by drying a defined amount of the particular aqueous copolymer dispersion (approx. 5 g) to constant weight in an aluminum crucible having an internal diameter of approx. 3 cm at 140° C. in a drying cabinet. Two separate measurements were performed in each case. The values reported in the examples are the mean of these two measurements.

The mean particle diameters of the copolymer particles were determined generally by dynamic light scattering on a from 0.005 to 0.01 percent by weight aqueous copolymer dispersion at 23° C. by means of an Autosizer IIC from Malvern Instruments, England. The mean diameter of the cumulant analysis (cumulant z-average) of the measured autocorrelation function (ISO standard 13321) is reported.

The coagulate contents were determined generally by filtering 2 kg of the aqueous polymer dispersion obtained in the mixing vessel through a polyamide fabric with a mesh size of 125 μm, washing the filter residue with 100 ml of deionized water and then drying at 120° C. for 1 hour. The polyamide fabric was weighed before the filtration and after the drying at room temperature, and the coagulate contents in ppm were calculated from the weight difference.

COMPARATIVE EXAMPLE

The comparative example was performed analogously to the example with the differences that the initial charge was provided with 900 g and feed 1 with 500 g of deionized water, and, after the emptying of the pressure reactor, no flushing with deionized water was effected.

The aqueous copolymer dispersion thus obtained had a solids content of 45.1% by weight based on the total weight of the aqueous dispersion. The particle size was determined to be 138 nm and the coagulate content to be 110 ppm.

The invention claimed is:

1. A process for preparing an aqueous polymer dispersion having a polymer solids content of X % by weight by a free-radically initiated aqueous emulsion polymerization in a polymerization vessel, which comprises preparing an aqueous polymer dispersion with a polymer solids content of X+Y % by weight by the free-radically initiated aqueous emulsion polymerization in the polymerization vessel, transferring said aqueous polymer dispersion to a receiver, flushing the polymerization vessel with water and using the resulting flush water to dilute the aqueous polymer dispersion in the receiver to a solids content of X % by weight.

2. The process according to claim 1, wherein the polymer comprises, in copolymerized form,

| from 50 to 99.9% by weight of | esters of acrylic acid and/or methacrylic acid with alkanols having from 1 to 12 carbon atoms or styrene, or |
| from 50 to 99.9% by weight of | styrene and butadiene, or |
| from 50 to 99.9% by weight of | vinyl chloride and/or vinylidene chloride, or |
| from 40 to 99.9% by weight of | vinyl acetate, vinyl propionate and/or ethylene. |

3. The process according to claim 1, wherein the aqueous polymer dispersion in the receiver is subjected to an after-treatment to reduce the residual monomer content.

4. The process according to claim 1, wherein $X \geq 40$ and $\leq 60$ and $Y \geq 0.1$.

5. An aqueous polymer dispersion obtained by the process according to claim 1.

6. A binder in adhesives, sealants, polymer renders, paper-coating slips and paints, for the finishing of leather and textiles, for fiber bonding and for the modification of mineral binders comprising the aqueous polymer dispersion according to claim 5.

* * * * *